(12) United States Patent
Matthias et al.

(10) Patent No.: US 11,333,046 B2
(45) Date of Patent: May 17, 2022

(54) INTERNALLY COOLED VALVE FOR AN INTERNAL COMBUSTION ENGINE

(71) Applicant: FEDERAL-MOGUL VALVETRAIN GMBH, Barsinghausen (DE)

(72) Inventors: Thorsten Matthias, Hannover (DE); Antonius Wolking, Barsinghausen (DE); Fernando Arias, Hannover (DE); Florian Ringeling, Hannover (DE)

(73) Assignee: Federal-Mogul Valvetrain GmbH, Barsinghausen (DE)

( * ) Notice: Subject to any disclaimer, the term of this patent is extended or adjusted under 35 U.S.C. 154(b) by 0 days.

(21) Appl. No.: 16/760,743

(22) PCT Filed: Aug. 6, 2018

(86) PCT No.: PCT/EP2018/071242
§ 371 (c)(1),
(2) Date: Apr. 30, 2020

(87) PCT Pub. No.: WO2019/086154
PCT Pub. Date: May 9, 2019

(65) Prior Publication Data
US 2020/0347756 A1 Nov. 5, 2020

(30) Foreign Application Priority Data
Oct. 30, 2017 (DE) .................. 10 2017 125 365.3

(51) Int. Cl.
*F01L 3/18* (2006.01)
*F01L 3/02* (2006.01)
*B21K 1/22* (2006.01)

(52) U.S. Cl.
CPC ............... *F01L 3/18* (2013.01); *F01L 3/02* (2013.01); *B21K 1/22* (2013.01); *F01L 2301/00* (2020.05); *F01L 2820/01* (2013.01)

(58) Field of Classification Search
CPC . F01L 3/18; F01L 3/02; F01L 2301/00; F01L 2820/01; F01L 3/14; B21K 1/22; C09K 5/01
See application file for complete search history.

(56) References Cited

U.S. PATENT DOCUMENTS

2006/0005792 A1  1/2006  Bosler et al.
2012/0032543 A1*  2/2012  Chakraborty ........ C10M 125/02
                                            310/90

FOREIGN PATENT DOCUMENTS

| CN | 101713306 A | * | 5/2010 | ............... F01L 3/14 |
| CN | 101713306 A | | 5/2010 | |
| CN | 206221047 U | | 6/2017 | |
| DE | 1970267 U | | 10/1967 | |

(Continued)

OTHER PUBLICATIONS

International Search Report, dated Dec. 4, 2018 (PCT/EP2018/071242).

*Primary Examiner* — Jacob M Amick
*Assistant Examiner* — Charles J Brauch
(74) *Attorney, Agent, or Firm* — Robert L. Stearns; Dickinson Wright, PLLC

(57) ABSTRACT

An internally cooled valve (2) includes a valve body having a valve head (4) and a valve stem (6). The valve body has at least one cavity (8) in which coolant (10) is situated. The coolant is a nanofluid (12) in which nanoparticles (14) are dispersed in a dispersion medium (16).

9 Claims, 1 Drawing Sheet

(56) References Cited

FOREIGN PATENT DOCUMENTS

| | | | |
|---|---:|---|---|
| DE | 3015201 | A1 | 10/1981 |
| DE | 102009016938 | A1 | 10/2009 |
| JP | 2005048634 | A | 2/2005 |
| WO | 03074843 | A1 | 9/2003 |

\* cited by examiner

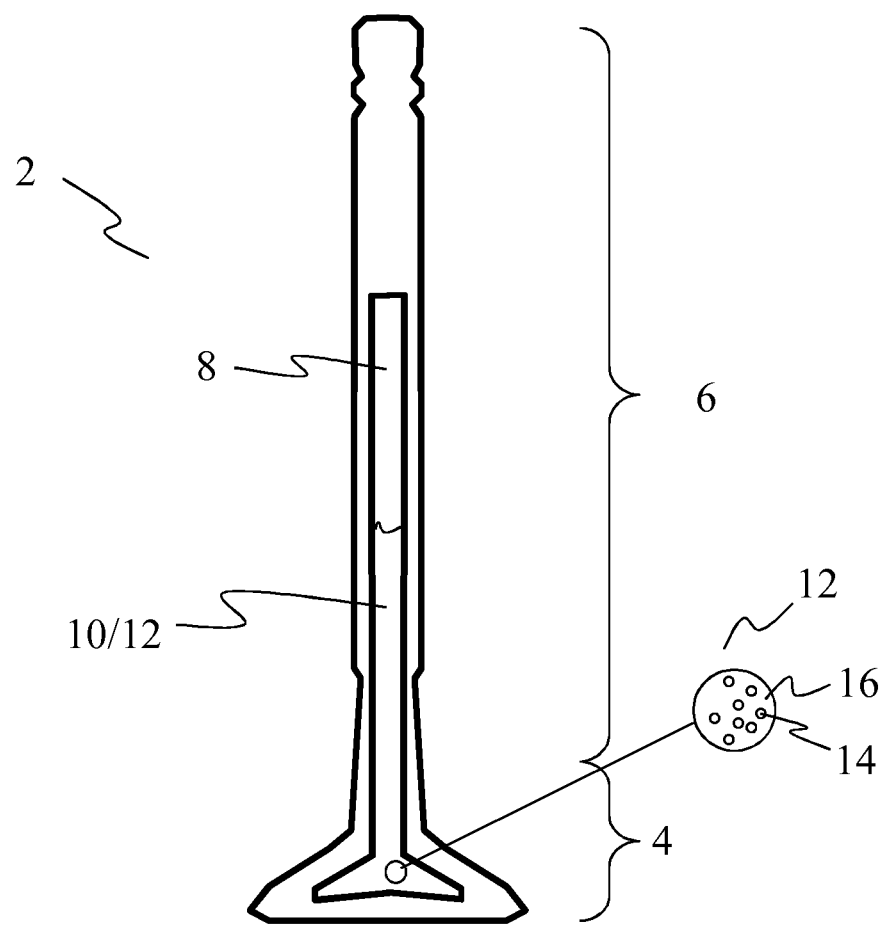

INTERNALLY COOLED VALVE FOR AN INTERNAL COMBUSTION ENGINE

BACKGROUND

1. Technical Field

The present invention relates to an internally cooled valve having improved cooling properties. The present invention relates in particular to an internally cooled valve comprising a valve body having a valve head and a valve stem, in the valve body at least one cavity being present in which a coolant, which at least at the operating temperature is a nanofluid, is accommodated or situated. Due to the properties of the particles in the nanofluid, the heat absorption and heat dissipation of the fluid are improved over that of a pure liquid, in that use is made of the thermal conductivity and/or the heat capacity of the particles in the nanofluid to allow the coolant to be better adapted to desired operating and design parameters.

2. Related Art

Many different internally cooled valves in various embodiments have become known due to the fact that this technology came into use quite some time ago.

Internal cooling is used primarily for exhaust valves, since intake valves are cooled by the supplied fresh air and the supplied mixture with each intake stroke, whereas exhaust valves are subjected to thermal load from the sides of the combustion chamber and also by the exhaust gases flowing past.

Approximately 60% of the cavity of an internally cooled exhaust valve is typically filled with sodium. Due to the partial filling, the sodium, which is liquid at the operating temperature of the engine, can move from the valve head toward the valve stem each time the valve opens, and can move from the valve stem toward the valve head each time the valve closes, thereby transporting thermal energy. At the valve head and at the lower portion of the valve stem the valve and the coolant absorb heat, and at the valve stem, which is guided in the cooled engine head, the valve and thus also the coolant release the heat. This type of cooling is known as "shaker cooling." Exhaust valves may reach temperatures of up to 900° C. It is possible to reduce the temperature by approximately 150° C. by effective cooling.

It has previously likewise become known to fill the cavity of a valve with lead, as described in German patent application DE 1970267 A1.

In addition, it is known from the document CN 101713306 to provide an internally cooled valve having a sodium filling into which nanoparticles are introduced. The document JP 2005048634 A describes a valve having a core made of a carbon composite. International patent application WO 03/074843 A1 discloses a lightweight valve having a support structure and a sodium filling. Patent application DE 3015201 A1 relates to an internally cooled valve having a sodium filling to which copper particles are additionally added. An internally cooled valve is known from patent application DE 10 2009 016938 A1 which, however, in contrast to known sodium-cooled valves is filled not with sodium, but, rather, with graphite, copper, a copper alloy, or a copper-based sintered material.

SUMMARY

It is desirable to improve the cooling of an internal combustion engine valve, in particular an exhaust valve.

According to one aspect of the present invention, an internally cooled valve is provided that comprises a valve body having a valve head and a valve stem, the valve body having at least one cavity in which a nanofluid as coolant is situated. A nanofluid is defined as a dispersion of small particles in the nanometer range, also referred to as nanoparticles, in a liquid. A dispersion of/with nanoparticles is present, but for the sake of brevity the term "nanofluid" is used below, even if it does not necessarily involve "microfluids" here, as implied by the name.

In one embodiment of the present invention, the nanofluid is present in a nanofluid form only at an operating temperature, and may be present in a solid state of matter at room temperature of 20° C. or standard conditions at 0° C.

In another exemplary embodiment of the present invention, the nanofluid includes sodium, lithium, potassium, cesium, or a sodium-potassium alloy as dispersion medium. Most of the experience with manufacturing internally cooled valves has been gained using sodium. However, depending on the required properties, lithium, potassium, cesium, or the alloys thereof may be used as a dispersion medium. It likewise appears possible to use Wood's metal or other metals having a low melting point. Here as well, a fluid having a high thermal conductivity and a high heat capacity should be used.

In another exemplary embodiment of the internally cooled valve, the nanofluid includes nanoparticles from the group selected from titanium particles, nanodiamonds, silicon carbide particles, beryllium particles, boron nitride particles, and/or graphene particles as the dispersed particles. The silicon carbide particles and the nanodiamonds (i.e., diamonds having a grain size of several nanometers) are very well suited for increasing the heat capacity of the nanofluids compared to a conventional pure coolant such as sodium. The small particles have a very advantageous surface/mass ratio, which allows even a material with relatively poor heat conduction properties to quickly heat. In the process, the heat from the dispersion medium is conducted around the particle and can heat the nanoparticle over the entire surface, which is possible in a short period of time due to the small dimensions and the advantageous surface/mass ratio, even for materials that are very poor heat conductors. In contrast, nanoparticles such as titanium are very good heat conductors, and can significantly increase the speed with which heat is transferred from the valve disk to the nanofluid or from the nanofluid to the valve stem.

In another embodiment of the internally cooled valve, the nanofluid is designed as a ternary nanofluid that includes at least two different types of nanoparticles. Likewise, nanoparticles that are good heat conductors and nanoparticles having a high heat capacity may be mixed in the nanofluid in order to increase the thermal conductivity of the nanofluid on the one hand and increase the heat capacity of the nanofluid on the other hand.

Another exemplary embodiment of the internally cooled valve uses a nanofluid that contains particles or nanoparticles having a diameter in the range of 2 to 100 nm, preferably 4 to 50 nm, more preferably 6 to 20 nm. Although the smaller diameters increase the risk of aggregation and prevent rapid dispersion, due to the smaller Reynolds numbers [the particles] fall much more slowly than larger particles. When the particles are small enough, they fall so slowly that the engine and thus the coolant solidifies prior to falling, and the problem with aggregation may be completely avoided.

In another embodiment of the internally cooled valve, a portion of the particles in the nanofluid is between 0.5 and 30 volume percent, preferably between 2 and 20 volume percent, more preferably between 5 and 10 volume percent. It may thus be ensured that the nanoparticles have only a minor influence on the flow properties of the coolant. In addition, with these proportions of nanoparticles a noticeable improvement in the cooling properties is achieved with regard to heat conduction and/or heat capacity.

In another embodiment of the internally cooled valve, the nanofluid also includes a dispersant that prevents or is designed to prevent the nanoparticles from combining to form nanoparticle aggregates, and to allow or facilitate redispersion of the nanoparticles after they have deposited. A surfactant or tenside may be used as a dispersant or dispersing aid.

THE DRAWING

The present invention is explained below with reference to a schematic illustration of an internally cooled valve according to the invention.

FIG. 1 shows an internally cooled valve according to the invention in a sectional view.

DETAILED DESCRIPTION

FIG. 1 illustrates an internally cooled valve 2 in a sectional view. The valve includes a valve head 4 that has the valve disk, and a valve stem with which the valve is typically guided in an engine head. The valve disk closes off the combustion chamber, and for an exhaust valve the hot combustion gases flow around the entire valve head during each exhaust stroke. This high thermal load may be dissipated only via the relatively thin, long valve stem 6.

A cavity 8 extends in the valve 2 from the valve head 4 into the valve stem 6. A portion of this cavity 8 is filled with a coolant 10. Each time the valve opens, on account of the mass inertia the coolant 10 flows from the valve head 4 into the valve stem 6, and due to its temperature and heat capacity also transports a certain quantity of thermal energy into the valve stem, which is cooled by the cylinder head. Each time the exhaust valve 2 closes at the start of the intake stroke, the cooled coolant 10 flows from the valve stem back into the valve head, and can cool the valve head by utilizing the thermal energy thereof to once again increase its own temperature. It should be clear that this principle functions better the higher the heat capacity of the coolant and the higher the thermal conductivity of the coolant.

According to the invention, the coolant is designed as a nanofluid in which particles having dimensions in the nanometer range are dispersed in a liquid. This is illustrated in the enlarged detail. The nanofluid 12 includes nanoparticles 14 that are dispersed in a dispersion medium 16. When the nanoparticles 14 have a much higher thermal conductivity than the dispersion medium 16, they increase the overall thermal conductivity of the nanofluid compared to the pure dispersion medium 16. This takes place by the nanoparticles "thermally short-circuiting," in a manner of speaking, the areas in which they are present. When the nanoparticles 14 have a much higher heat capacity than the dispersion medium 16, they increase the overall heat capacity of the nanofluid 12 compared to the pure dispersion medium 16. In the process, the thermal conductivity is not reduced to a particularly great degree, since the particles are very small, and the heat, so to speak, can flow around these particles. Even if the nanoparticles 14, with a high heat capacity, have a low thermal conductivity, they can still be completely heated quickly, since they have a very large surface in relation to their mass, and the nanoparticles therefore reach thermal equilibrium with the dispersion medium 16 very quickly. The dispersion medium heats up around the nanoparticles, and thus heats them from all sides.

Ternary systems may also be used, in which nanoparticles having an increased conductivity and other nanoparticles having an increased heat capacity are used together in a dispersion medium, so that additional use may be made of both effects.

The cooling of exhaust valves may thus be improved, which allows use of higher operating temperatures and combustion temperatures, which in turn benefits improved efficiency of the internal combustion engine. The shaker effect ensures that the nanoparticles remain in a dispersed state and are not able to deposit. By using a dispersion medium 16 that has a solid state of matter under nonoperating conditions, the dispersion may be "frozen" in a manner of speaking, and the nanoparticles are not able to deposit even with a stationary, cold engine. The solidifying dispersion medium freezes the dispersed state until the engine is restarted. The nanofluid may be used in cavity valves, hollow stem valves, and hollow head valves. The nanofluid may be used with valves having one or more cavities.

Sodium and nanoparticles are used in the illustrated cavity valve, thus increasing the cooling effect of the coolant compared to pure sodium. The nanoparticles likewise reduce the reactivity of the sodium, so that it is easier to handle.

The invention claimed is:

1. An internally cooled valve, comprising
   a valve body having
   a valve head and
   a valve stem,
   at least one cavity in the valve body in which a nanofluid coolant is disposed,
   wherein the nanofluid coolant comprises sodium, lithium, potassium, cesium, or a sodium-potassium alloy as dispersion medium; and includes at least two of the following types of nanoparticles: titanium particles, nanodiamonds, silicon carbide particles, beryllium particles, boron nitride particles, and/or graphene particles as dispersed particles, and wherein at least one of the selected nanoparticles has the property of high heat capacity relative to the selected dispersion medium and wherein another of the selected nanoparticles has the property of high heat conductivity relative to the selected dispersion medium, such that the nanofluid coolant is a ternary system that includes two different types of nanoparticles that contribute two different properties to the nanofluid, and
   wherein the nanofluid further includes a dispersing aid that is operative to prevent the nanoparticles from combining to form nanoparticle aggregates.

2. The internally cooled valve according to claim 1, wherein the nanofluid has a solid state under ambient cold engine conditions and has a fluid form under hot engine operating temperatures up to 900° C.

3. The internally cooled valve according to claim 1, wherein the nanoparticles have a diameter in the range of 2 to 100 nm.

4. The internally cooled valve according to claim 1, wherein nanoparticles comprise between 0.5 and 30 volume percent of the nanofluid coolant.

5. The internally cooled valve according to claim 3, wherein the range is between 4 to 50 nm.

6. The internally cooled valve according to claim 3, wherein the range is between 6 to 20 nm.

7. The internally cooled valve according to claim 4, wherein the volume percent is between 2 and 20.

8. The internally cooled valve according to claim 4, wherein the volume percent is between 5 and 10.

9. An internally cooled valve comprising:
- a valve head;
- a valve body;
- an internal cavity;
- a coolant with a dispersion medium that has a solid state under ambient condition and a liquid state at an operating temperature of the valve up to 900° C. contained within the cavity;
- at least two different types of nanoparticles contained within the coolant dispersion medium with one of the selected nanoparticles having the property of high heat capacity relative to the dispersion medium and wherein another of the selected nanoparticles having the property of high heat conductivity relative to the dispersion medium, such that the coolant is a ternary system that includes two different types of nanoparticles that contribute two different properties to the nanofluid in combination with a dispersing agent.

* * * * *